May 12, 1925.
C. A. GOOD
1,537,764
APPARATUS FOR RAISING SUNKEN VESSELS
Filed Jan. 12, 1925     3 Sheets-Sheet 3
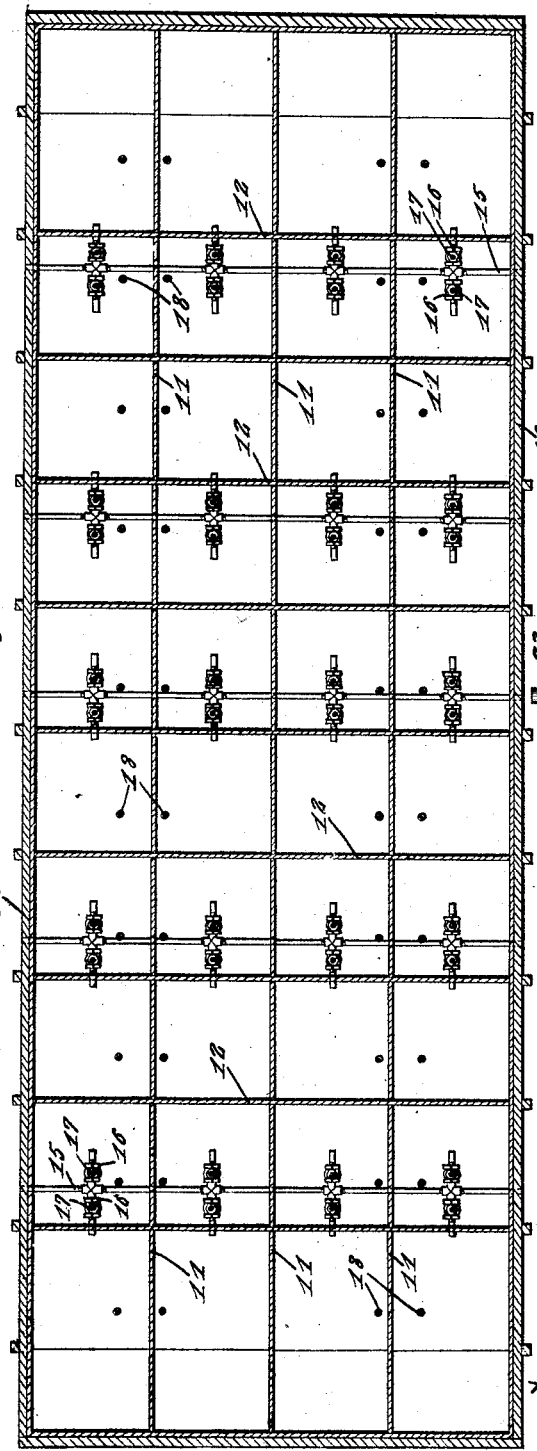
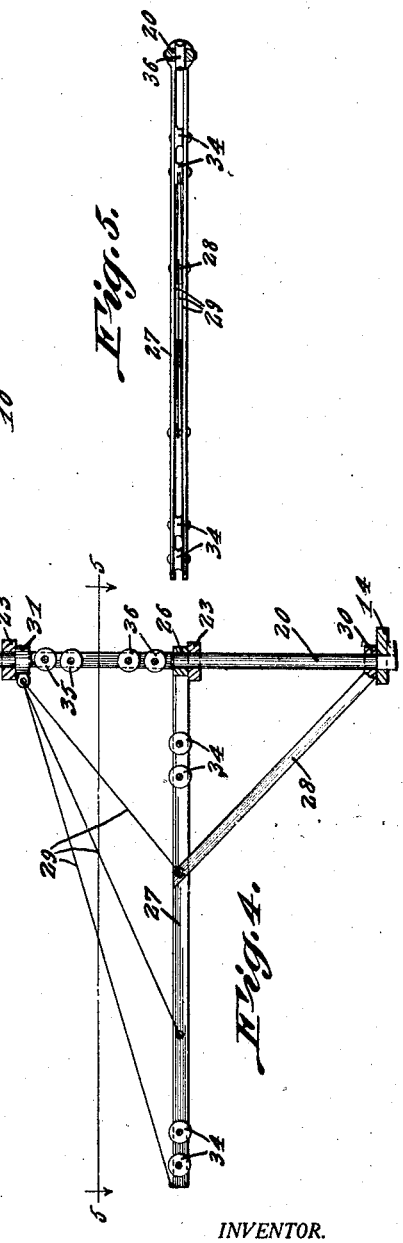
INVENTOR.
Chester A. Good,
BY
Geo. P. Kimmel
ATTORNEY.

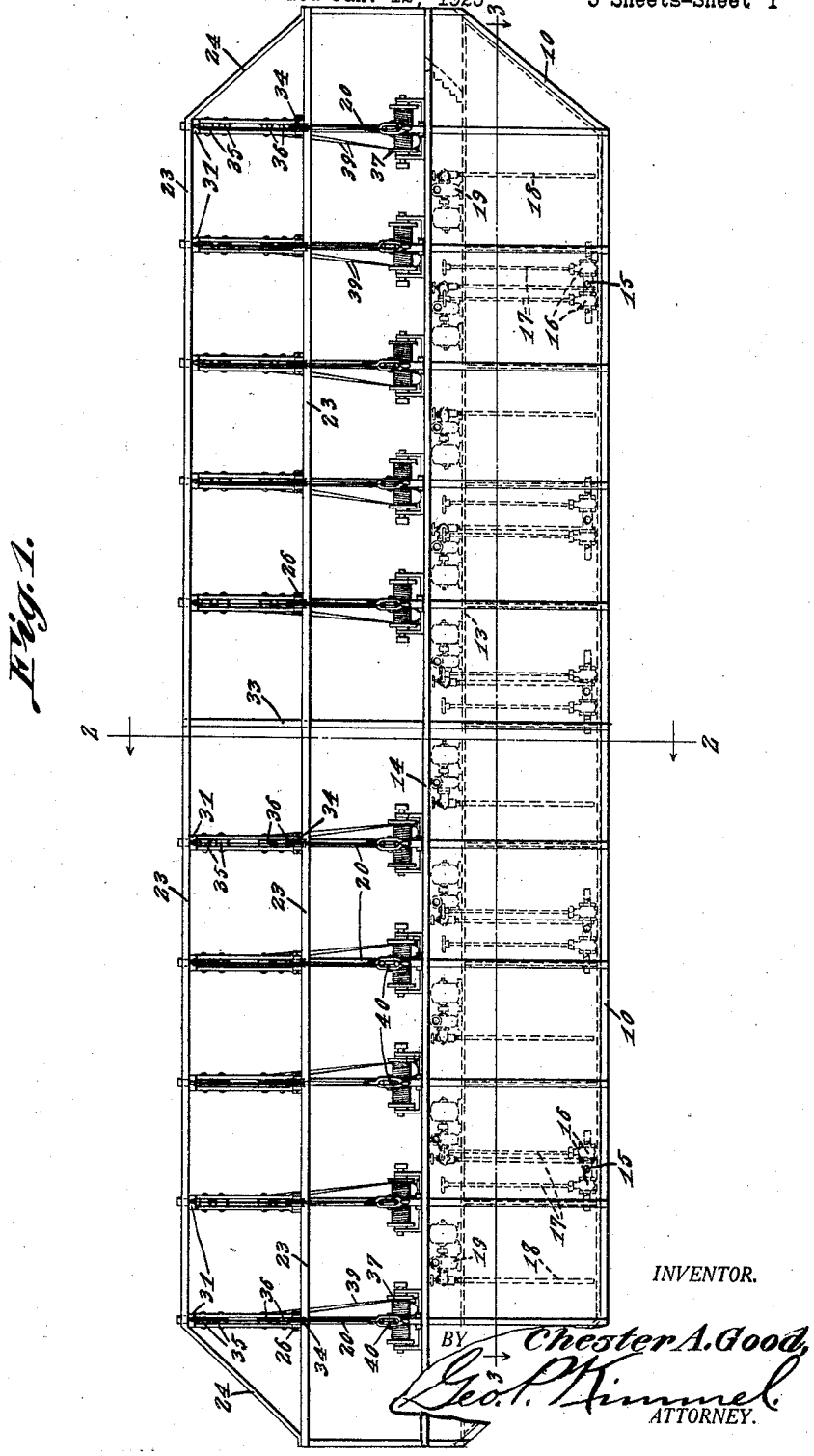

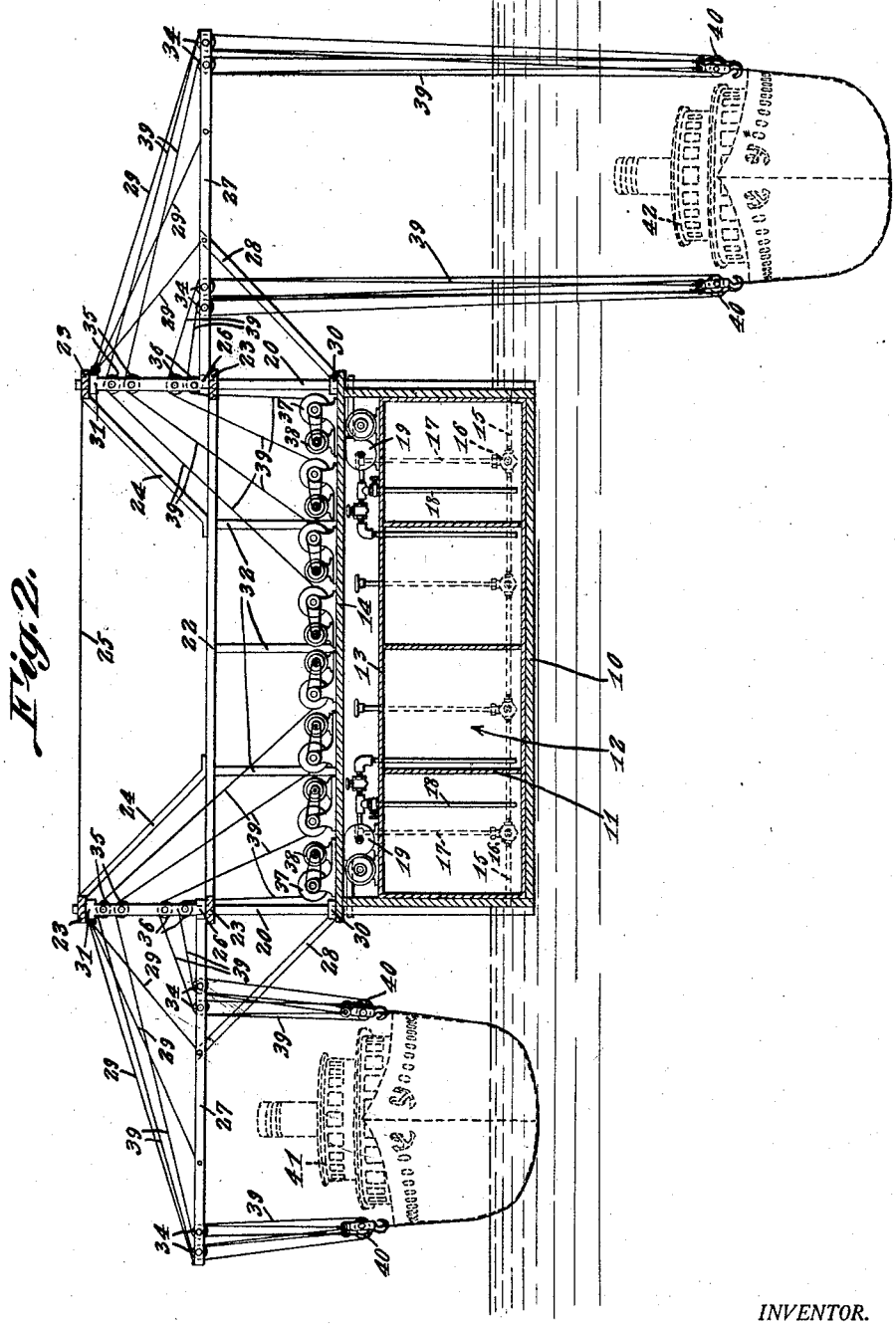

Patented May 12, 1925.

1,537,764

UNITED STATES PATENT OFFICE.

CHESTER A. GOOD, OF GROVETON, TEXAS.

APPARATUS FOR RAISING SUNKEN VESSELS.

Application filed January 12, 1925. Serial No. 1,880.

*To all whom it may concern:*

Be it known that I, CHESTER A. GOOD, a citizen of the United States residing at Groveton, in the county of Trinity and State of Texas, have invented certain new and useful Improvements in Apparatus for Raising Sunken Vessels, of which the following is a specification.

This invention relates to apparatus for raising sunken vessels, and has for one of its objects to simplify and improve the construction and increase the efficiency and utility of devices of this character.

The improved apparatus contemplates the employment of a floating barge containing a plurality of water and air proof tanks, means for supplying water to the tanks and expelling it therefrom, a plurality of masts carried by the barge, booms preferably swinging from the masts and adapted to be disposed longitudinally of the barge or extended transversely of and beyond opposite sides of the barge, a floating counterpoise supported from the booms at one side of the barge, and means for connecting the vessel to be raised to the booms at the other side of the barge.

With these and other objects in view, the invention consists in certain novel features of construction as hereinafter shown and described and then specifically pointed out in the claims, and in the drawings illustrative of the preferred embodiment of the invention.

Figure 1 is a side elevation of the improved apparatus.

Figure 2 is a transverse section on the line 2—2 of Figure 1 looking in the direction of the arrows.

Figure 3 is a plan view in section on the line 3—3 of Figure 1.

Figure 4 is a detail, partly in section, of one of the masts and its swinging boom.

Figure 5 is a detail plan view of one of the booms.

The barge portion of the improved apparatus may be of any size or proportion, and is represented as a whole at 10, preferably with inclined ends to facilitate its movement through the water.

Located within the barge are a plurality of water and air proof tanks, either with individual walls, or produced by a plurality of longitudinal partitions 11 and transverse partitions 12, as indicated.

The tops 13 of the tanks form a platform spaced below the deck 14 of the barge, as shown, and also to allow for displacement of barge.

Intake pipes 15 are arranged to admit water to the tanks through the side walls of the barge, each intake being provided with a controlling valve 16 in each tank, the valves being each provided with an operating rod 17 leading through the tops of the tanks and preferably operative below the deck 14.

Each tank is also provided with a suction pipe 18 leading into a pump represented conventionally at 19. By this means the tanks may be independently supplied with water, or the water independently exhausted therefrom as required. The barge may thus be effectually lightened or its weight increased or decreased, and the water utilized to ballast or trim the barge to correspond to the requirements, as hereafter described.

Supported upon the sides of the barge are a plurality of masts 20, eight being shown at each side, but any number may be employed, as required.

The masts at the opposite sides of the barge are supported by transverse braces 22, longitudinal braces 23, inclined braces 24, and tie rods 25, arranged in any suitable manner to prevent the masts being disarranged by the severe strains to which they will be subjected.

Mounted to swing at 26 upon each of the masts 20 is a boom, each preferably formed of spaced members 27 and supported by a diagonal brace 28 and tie rods 29.

The braces 28 are arranged to swing respectively at the lower ends at 30 to the masts 20 next to the deck 14, and the tie rods 29 are coupled respectively to a collar 31 rotative on the masts 20 next to the upper longitudinal brace members 23, as shown more clearly in Figure 4.

By this means the booms are firmly supported and free to swing into position longitudinally of the barge, or transversely thereof and extending beyond the same from opposite sides, as shown in Figures 1 and 2.

The transverse braces 22 are preferably supported by spaced vertical struts 32, and the longitudinal braces 23 likewise supported by one or more vertical struts, one of which is represented at 33.

Supported between the side members of each of the booms are cable guide pulleys 34, any required number being employed, but for the purpose of illustration, two pairs are shown installed in each boom.

Supported on each of the masts 20, near the upper end, is a pair of cable guide pulleys 35, and likewise supported on the mast near the boom swivel 26 is another pair of cable guide pulleys 36.

Located on the deck 14 are a plurality of hoisting devices, each including a cable winding drum 37 and motor 38, the latter preferably electrically operated from any suitable source of electric power, not shown.

Any required number of the winding drums and motors may be employed, but for the purpose of illustration, four are indicated for each of the booms, so that a pull cable 39 may be conducted from one of the drums over the guide pulleys 34, 35 and 36 and thence to hoisting blocks 40.

One series of the hoisting cables 39 and the blocks 40 at one side of the barge 10 will be attached to a counterpoise, for instance a loaded vessel, indicated conventionally at 41, and the opposite series will be attached to the vessel to be raised, and indicated at 42.

The counterpoise will be weighted with rock, sand or other material to correspond substantially to the weight of the vessel to be raised, and when the motors are operated to apply pulling force upon the cables, the force will be balanced and the derrick carrying barge maintained on an even keel.

The tanks will be supplied with sufficient water to provide the necessary ballast to enable the barge to be moved with safety through rough water.

The counterpoise may be a loaded vessel or a barge loaded with any material to correspond substantially to the weight of the vessel to be raised. When everything is made ready and cables are all drawn tight by motors, the water ballast is pumped from ballast tanks until the desired lifting power is acquired, and then the motors which are attached to the vessel to be raised are set in motion and the vessel brought to the surface.

The improved device is simple in construction, can be made of any required size or material and adapted for use in raising sunken vessels, and for like purposes, and the weight of the counterpoise increased or decreased as required.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed is:

1. An apparatus of the class described, comprising a floating barge, a plurality of booms carried by said barge and extending from opposite sides thereof, a floating counterpoise supported from said booms at one side of the barge, and means adapted to connect a vessel to be raised to the booms at the opposite side of the barge.

2. An apparatus of the class described, comprising a floating barge, a plurality of tanks within said barge, means for supplying water to said tanks, means for expelling water from said tanks, a plurality of booms carried by said barge and extending from opposite sides thereof, a floating counterpoise supported from said booms at one side of the barge, and means adapted to connect a vessel to be raised to the booms at the opposite side of the barge.

3. An apparatus of the class described, comprising a barge, a plurality of masts supported on said barge, booms supported from said masts and extending beyond opposite sides of said barge, a floating counterpoise supported from said booms at one side of the barge, and means adapted to connect a vessel to be raised to the booms at the other side of said barge.

4. An apparatus of the class described, comprising a barge, a plurality of tanks within said barge, means for supplying water to said tanks, means for expelling water from said tanks, a plurality of masts supported on said barge, booms supported from said masts and extending beyond opposite sides of said barge, a floating counterpoise supported from said booms at one side of the barge, and means adapted to connect a vessel to be raised to the booms at the other side of said barge.

5. An apparatus of the class described, comprising a barge, a plurality of masts supported on said barge, booms swinging upon said masts and adapted to be disposed longitudinally of the barge or extended transversely of and beyond opposite sides of the same, a floating counterpoise supported from said booms at one side of the barge, and means adapted to connect a vessel to be raised to the booms at the other side of said barge.

In testimony whereof, I affix my signature hereto.

CHESTER A. GOOD.